May 3, 1960

P. T. ANGELL ET AL 2,935,294

DOUBLE WALL TURBINE SHROUD

Filed Jan. 22, 1957

Inventor
PIERCE T. ANGELL
JAMES C. WISE

By *[signature]* Attys

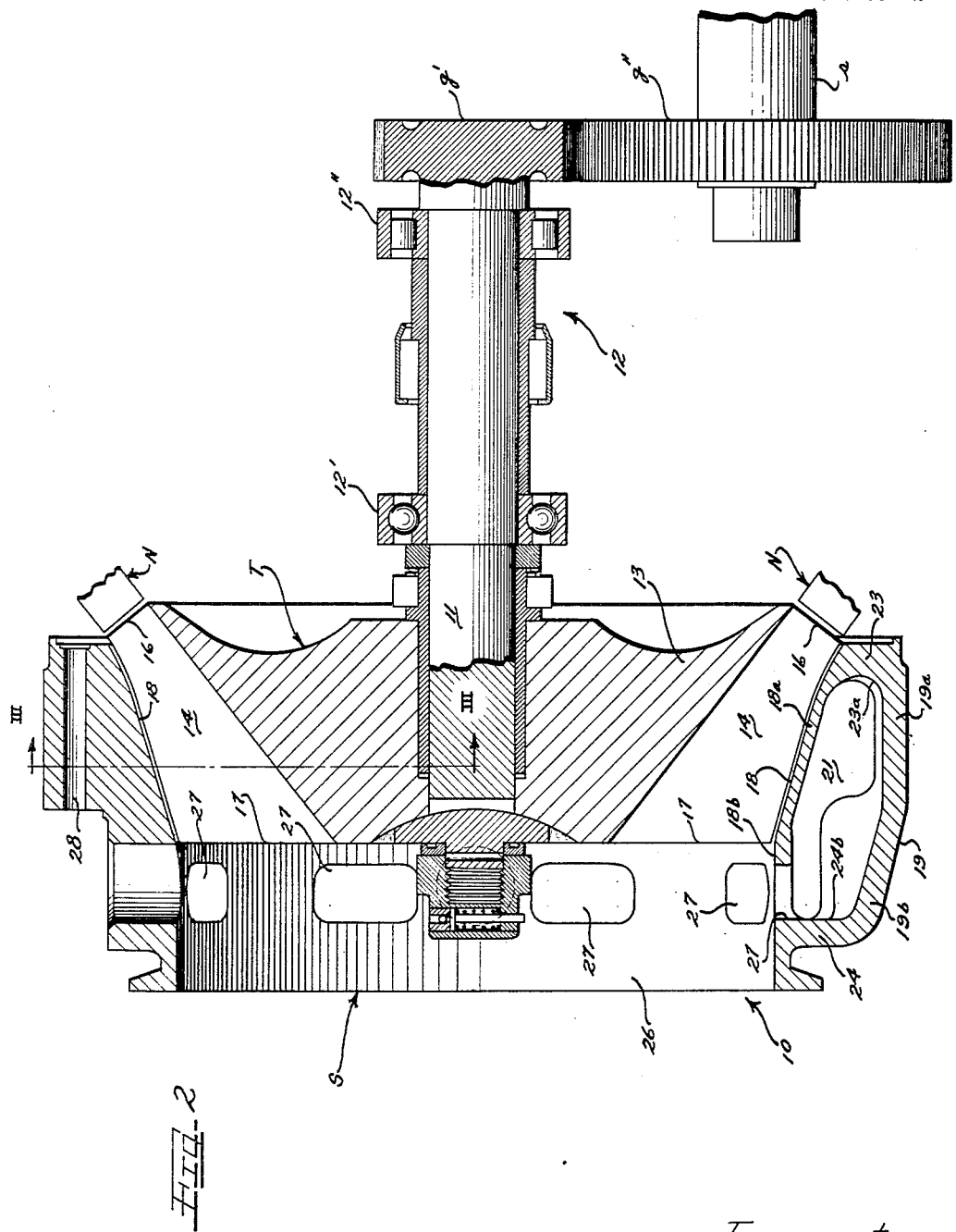

May 3, 1960  P. T. ANGELL ET AL  2,935,294
DOUBLE WALL TURBINE SHROUD
Filed Jan. 22, 1957  3 Sheets-Sheet 3
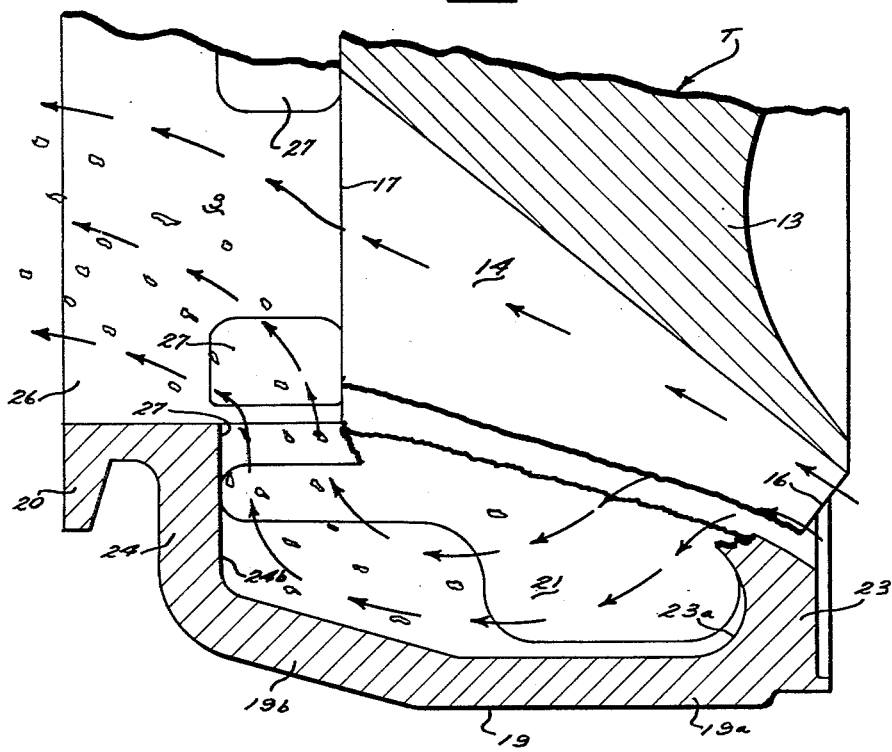
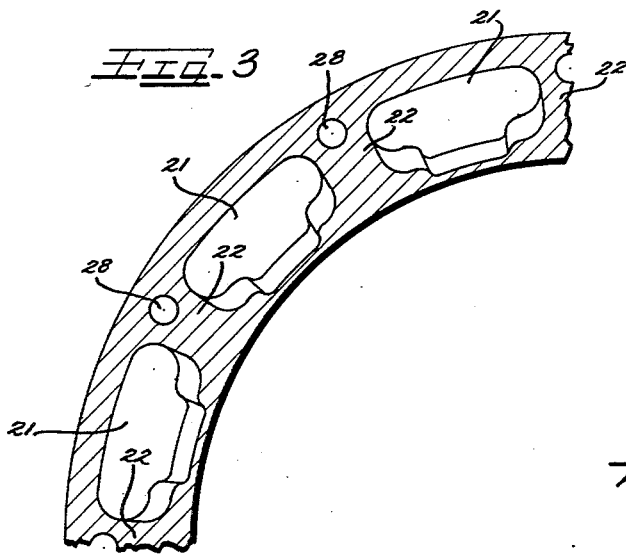
Inventor
PIERCE T. ANGELL
JAMES C. WISE

United States Patent Office 2,935,294
Patented May 3, 1960

2,935,294

DOUBLE WALL TURBINE SHROUD

Pierce T. Angell and James C. Wise, Pepper Pike, Ohio, assignors to Thompson Ramo Wooldridge Inc., a corporation of Ohio Application January 22, 1957, Serial No. 635,212

7 Claims. (Cl. 253—39)

This invention relates to a turbine wheel shroud or housing having an expendable inner wall. Specifically, this invention relates to an improved double wall turbine shroud for use in conjunction with an associated high-speed turbine wheel, the shroud being so constructed as to have its inner wall frangible to rubbing contact with the turbine wheel, such that in the event of a control, structural, or bearing failure of the wheel, fragments of the wheel and inner shroud wall will be harmlessly discharged from the turbine drive assembly with a minimum danger of damage to components adjacent to the turbine assembly and at the same time will prevent development of runaway conditions of the wheel.

One of the problems being encountered in the development of light-weight turbine drives, such as are currently being used in supersonic aircraft and missiles, is that of preventing damage to adjacent components in the aircraft and the turbine drive system itself, upon failure of the wheel under extreme operating speed conditions that are dictated by minimum-weight high-output requirements.

As a result of the continually increasing demands being imposed on the electrical systems of current supersonic aircraft and missiles, due to increased instrumentation and control systems, coupled with more stringent minimum-weight requirements for the aircraft and related components, particularly in turbine driven alternator drive systems, the turbine drive assemblies have become progressively smaller and operating speeds have progressively increased to the extent that failure of the wheel under these conditions would not only result in destruction of the turbine drive, but would cause damage to adjacent components in the aircraft. Extreme turbine wheel speeds not only enhance the possibilities of failure from overspeed conditions or bearing failure, but also permit the wheel to expand or "grow" due to the combined influence of heat and centrifugal force.

If the turbine wheel is enclosed in a conventional shroud, and the blades of the wheel came into running contact with the shroud, either due to growth of the wheel, an overspeed condition, or failure of the turbine wheel shaft bearings, fragments of these components would be ejected from the turbine assembly at projectile-like speeds and probably destroy or at least damage other adjacent components in the aircraft.

The present invention offers one solution to this problem in the form of an improved double-wall turbine wheel shroud which, in the event of an operational failure of the turbine wheel for any reason, will have its inner wall fractured and pulverized to a safe minimum size while its outer wall will direct any fragments of shroud or wheel into the exhaust outlet of the turbine drive assembly without damage to adjacent components in the aircraft. At the same time, the wheel driving gases are by-passed around the wheel to prevent over-speeding of the wheel.

To this end, the turbine shroud of the present invention is provided with a hollow annular cavity or series of pockets around the wheel, and a plurality of radial apertures that register with these cavities immediately downstream of the wheel, such that under normal operating conditions, the pockets and registering apertures are not subject to any driving gas flow, but as soon as the inner shroud wall is disintegrated, the radial cavities and apertures form a by-pass flow passage around the wheel to direct a flow of the driving gases across the back face of the turbine wheel and thereby establish an "air-fence," which serves not only to limit the maximum speed of the turbine wheel under runaway load conditions and prevent any further downstream axial movement of the wheel in the shroud, but also serves to direct displaced turbine wheel and shroud fragments radially inwardly through the outlet of the turbine drive assembly.

It is then an object of the present invention to provide a safety turbine shroud for the turbine wheel of a turbine drive assembly.

Another object of the present invention is to provide a double-walled casing for a turbine wheel assembly which will guide fragments broken off from the assembly so as to prevent damage to adjacent components.

A further object of the present invention is to provide an improved turbine shroud construction such as will minimize the danger of damage to the associate turbine drive components and other surrounding components of the aircraft upon a rubbing contact between the turbine wheel and shroud, by the formation of an "air-fence" on the downstream side of the turbine wheel to limit the maximum speed and axial movement of the turbine wheel in the shroud as well as to displace wheel and shroud fragments safely away from the turbine drive assembly.

Another object of the present invention is to provide a casing or housing for a turbine wheel that will permit a continued operation of the wheel even after partial destruction of the housing and wheel.

Still another object of the present invention is to provide a double-wall turbine shroud with a cutter to assist in the pulverizing of turbine wheel and shroud fragments that have been dislodged.

Many other objects and advantages of the present invention will become manifest to those versed in the art upon making reference to the accompanying sheets of drawings and detailed description which follows, that form a part of this specification.

On the drawings:

Figure 2 is a side cross-sectional view of the present invention, substantially along the line II—II of Figure 1;

Figure 3 is a fragmentary cross-sectional view of an arcuate portion of the turbine shroud of the present invention, taken substantially along the line III—III of Figure 2;

Figure 1:
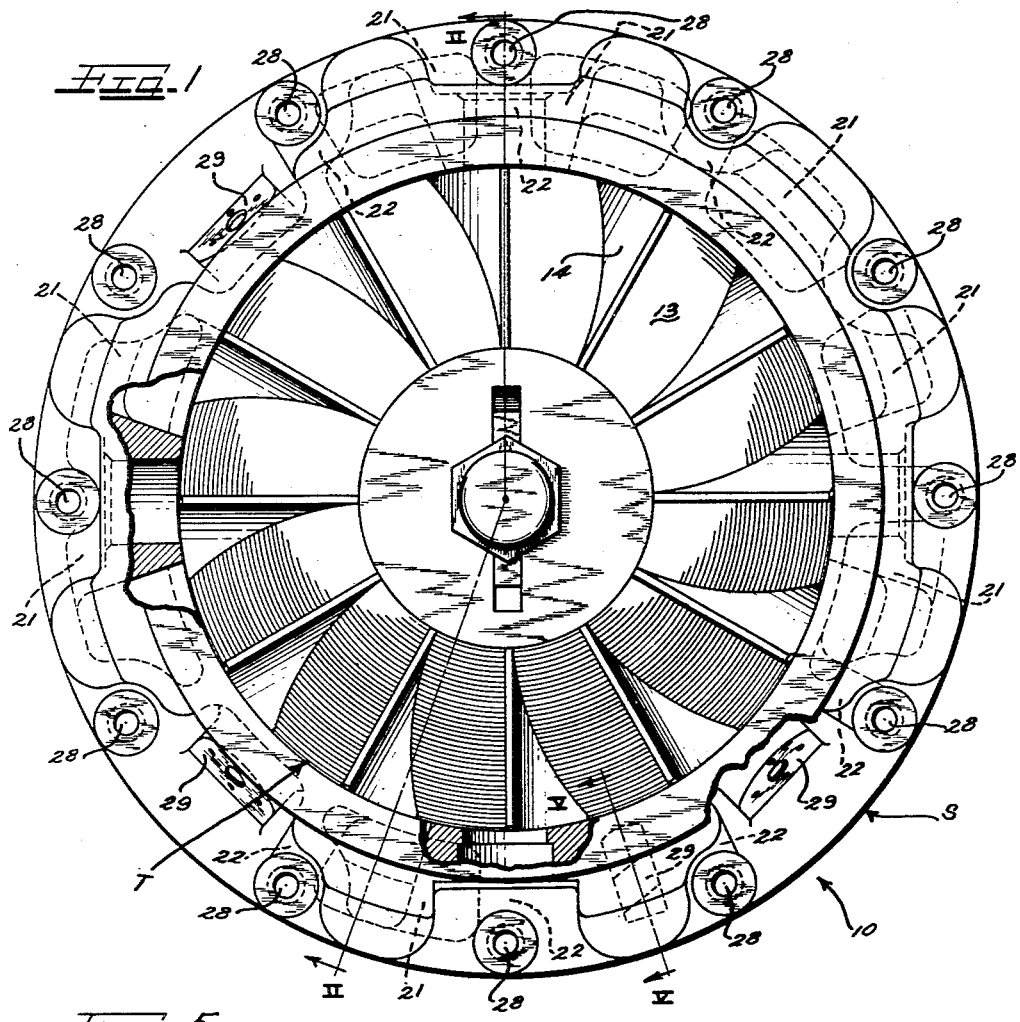
Figure 1 is a reduced front elevational view of the turbine shroud of the present invention and a conventional turbine wheel, with some parts in section and some parts in phantom.
Figure 5:
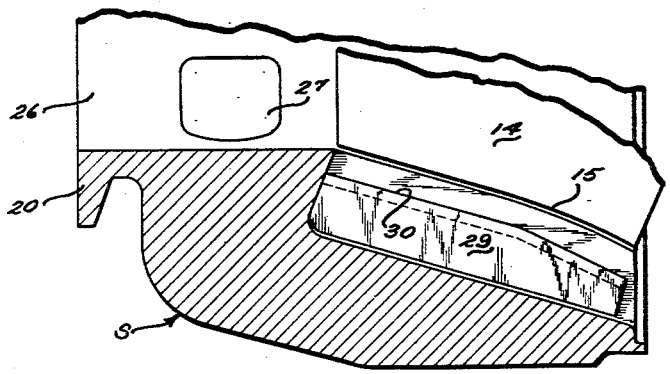

Figure 4 is an enlarged fragmentary side cross-sectional view of the turbine shroud of the present invention, showing the resultant configuration and respective positions of the parts after the turbine wheel has come into rubbing contact with the shroud; and Figure 5 is an enlarged fragmentary side cross-sectional view of the shroud, taken substantially along the line V—V of Figure 1 showing the details and position of the cutter in the inner wall of the shroud of the present invention.

As shown on the drawings:

In Figures 1 and 2, a typical turbine wheel and shroud assembly 10 is illustrated, that includes the turbine shroud assembly S of the present invention and a turbine wheel assembly T, that is connected to a shaft 11 and supported in a bearing assembly 12. The shaft 11 includes a reduction gear g' and an idler gear g" that drives an idler shaft s. The idler shaft s may be connected to a driven element or to another reduction gear train, depending on the desired operating speed requirements.

The turbine wheel assembly T may be of any conventional type, but is preferably constructed with a solid cone or body portion 13 having a plurality of integral vanes 14 formed thereon (Figures 1 and 2), the vanes 14 preferably having an axially tapering arcuate configuration (Figure 1).

As illustrated in Figure 2, the vanes 14 are formed with a substantially smaller radial leading edge portion 16, that progresses axially radially inwardly into a substantially longer radial trailing edge portion 17, thereby providing a flow channel through the vanes 14 of increasing cross-sectional area from the leading edges 16 to the trailing edges 17 to permit optimum pressure recovery and efficiency of the turbine wheel T for a given operating speed. A plurality of nozzle assemblies N are annularly positioned around the leading edges 16 to direct a pressurized flow of high velocity gases into the vanes 14, and thus deliver rotative torque to the turbine wheel assembly T.

The bearing assemblies 12 may be of any suitable type that will withstand extreme rotational speeds and temperature gradients, such as can normally be expected in the operation of an extremely high-speed turbine drive, such as are present in the turbine wheel and shroud assembly 10. To this end a ball bearing race 12', and a roller bearing race 12", have been illustrated as a typical bearing assembly.

Referring now to Figures 1 and 2, the turbine shroud S is formed in generally circular tapering configuration, having an annular inner wall surface 18 and a radially spaced annular outer wall surface 19. The inner and outer wall surfaces 18 and 19, respectively, become integral at a point downstream of the turbine wheel T, and terminate with an included annular radial flange 20, which facilitates connection of the turbine shroud and wheel assembly 10 to an outlet conduit or mounting hanger (not shown).

As shown in Figures 1 and 3, the shroud S includes a plurality of intermittently spaced annular pockets or cavities 21 between the inner and outer wall surfaces 18 and 19, the relative number, size, and spacing of the pockets 21 being most clearly shown in Figure 1. The position and spacing of the pockets 21 thus form a plurality of intermittently spaced radial ribs or webs 22 between adjacent pockets, and also define upstream and downstream inner and outer wall portions 18a, 18b, and 19a and 19b, on the shroud S, respectively.

As best shown in Figure 2, the annular inner wall surface 18 includes a generally thin-walled radially inwardly tapering upstream portion 18a and a generally axially extending thicker downstream wall portion 18b. Similarly, the annular outer wall surface 19 is formed with a generally thick axially extending upstream wall portion 19a and a radially inwardly tapering downstream wall portion 19b, the tapered wall portion 18a and 19b of the inner and outer shroud wall surfaces 18 and 19, respectively, being substantially parallel to each other and to the symmetrical axis of the vanes 14 on the turbine wheel T.

The generally axial inner and outer upstream wall portions 18a and 19a merge into a radial upstream end wall 23 having a generally arcuate inner wall configuration 23a. Similarly, the generally axial downstream wall portions 18b and 19b, merge into a radial downstream end wall 24, having a generally flat inner wall configuration 24b.

The purpose and function of the arcuate upstream inner wall configuration 23a and flat downstream inner wall configuration 24b will be explained as the description progresses.

As shown in Figures 2 and 4, the turbine wheel assembly T is enclosed by the radially tapering thin wall portion 18a of the inner wall 18, and the thickened axially extending portion 18b of the inner wall surface 18 extends downstream of the turbine wheel T to form an axial flow outlet 26 for spent driving gases discharging from the trailing edges 17 of the turbine vanes 14. As best shown in Figure 2, the thickened axial portion 18b of the inner wall surface 18 receives a plurality of radially intersecting apertures or slots 27 in an annular zone immediately downstream of the turbine wheel T, at a point substantially adjacent the trailing edges 17 of the vanes 14. The apertures 27 are circumferentially spaced around the thickened axial wall portion 18b, so as to register with the pockets 21 in the shroud S. The apertures may be of any shape, but are preferably formed with a generally rectangular plan to provide extended circumferential registry with the cavities 21.

In addition, the downstream axially extending inner wall portion 18b is intersected by a plurality of circumferentially spaced radial bores 28 preferably four, that receive a plurality of overspeed detecting fuses (not shown).

Thus, it will be appreciated that the cavities 21 are maintained at some predetermined pressure head by virtue of the registering apertures 27, which varies as a function of the static and dynamic pressure components of the driving gases discharging from the trailing edges 17 of the turbine vanes 14 through the outlet 26, though an actual flow path is not defined through the cavities 21 as long as the inner wall 18a remains intact.

It will also be appreciated then, that if the inner upstream wall portion 18a should become cracked or otherwise apertured due to rubbing contact with the turbine wheel T, a positive pressure increment and flow path would be established through the pockets 21 along the axially extending inner surface of the upstream outer wall 19a and downstream outer wall portion 19b, radially inwardly across the downstream end walls 24b, and through the apertures 27 into the shroud outlet 26, to thus form a plurality of jet streams of working fluid having a radially inwardly directed sense in the zone adjacent the trailing edges 17 of the vanes 14. Utilization of these jet streams in the operation of the turbine shroud and wheel assembly 10 in an emergency condition will be explained in more detail as the description proceeds.

In order to provide for assembly and mounting of the turbine shroud and wheel assembly 10, the webs 22 are axially bored as at 28 (Figures 1, 2, and 3) to receive a plurality of mounting bolts (not shown). Mounting pads 29 (Figure 1) are formed on the shroud S, to permit connection to a hanger or adjacent accessory components, as may be desired.

Under normal operating conditions, the turbine wheel T is positioned in the shroud S, such that the vanes 14 have their tapering circumferential edges 15 in close rotative proximity to the thin radially tapering inner wall 18a. High velocity gases from the nozzle assemblies N will thus be directed across the vanes 14 and through the outlet 26 to drive the turbine wheel T.

The operation of the turbine shroud S in an emergency condition is as follows: Assuming first that for some reason an overspeed condition should develop, such as might occur due to a malfunction or failure of the nozzle assembly control system, or a mechanical failure in the power transmission train from the turbine wheel T to the accessory that is being driven by the turbine wheel assembly 10, the turbine wheel T will begin to accelerate without restraint. As the rotational speed of the turbine wheel T continues to increase, centrifugal forces acting on the wheel will result in a turbine wheel "growth," to the point that the radial peripheral edges 15 of the vanes 14 will come into rubbing contact with the thin upstream inner wall portion 18a of the turbine shroud S.

A similar rubbing contact condition could occur at a much lower rotational speed in the event of failure of the bearing assemblies 12, such as would result from inadequate lubrication or cooling. In the event of failure of the bearing assemblies 12, the turbine wheel T would shift axially in the shroud S toward outlet 26 under the influence of the axial force component of driving gases from the nozzle assemblies N, thereby causing a rubbing contact between the radial peripheral edges 15 of the vanes 14 with the thin upstream inner wall portion 18a of the turbine shroud S, similar to the condition that would occur if the turbine wheel T "grew" into rubbing contact due to an overspeed condition.

It will be appreciated, of course, that various protective sensing systems are employed in the turbine shroud and wheel assembly 10, such as fuses or micro-switches, which sense turbine wheel "growth," axial shift and overspeed conditions, thereby to normally close the nozzle assemblies N. The sensing systems, however, are not entirely reliable, and for this reason, additional provision must be made to protect the turbine shroud and wheel assembly 10, as well as other components in the aircraft, from possible damage that would result from an uncontrolled overspeed or bearing failure condition.

In either event, upon high-speed rubbing contact between the peripheral vane edges 15 and inner wall portion 18a, a partial or total destruction of these components of the turbine shroud and wheel assembly 10 would result, to the extent that parts of the vanes 14 and inner wall 18a will be broken away and flung radially away from the wheel T with an extremely high centrifugal force component, such as is indicated in Figure 4. Fragments of the turbine wheel and inner shroud wall 18 will thus be radially and axially flung away from the wheel T, such that they will be swept into the cavity 21 and against the radially inwardly tapering inner surface of the downstream outer shroud wall 19b. Due to the combined action of the initiated by-pass flow of driving gases through the cavity 21 and slots 27, together with the inclined relationship of the inner surface of the wall portion 19b, turbine vane and outer shroud wall fragments will thus be harmlessly discharged through the outlet 26.

It should be noted that the outer shroud wall portion 19b is of sufficient thickness and may be constructed of suitable materials to withstand the impact and deflect the displaced turbine wheel and shroud fragments through the outlet 26 without passing completely through the shroud S.

Assuming again that the initial protective switches and fuses have failed, and that a downstream axial shift of the turbine wheel T has occurred, such that the peripheral vane edges 15 have come into rubbing contact with the thin radially inner wall portion 18a, and that portions of the vanes 14 and inner shroud wall 18a had been broken away and centrifugally displaced, as indicated in Figure 4, an additional control and protective system is provided whose operation is as follows:

On a continued axial shift and rubbing contact between the peripheral edges 15 of the vanes 14 and inner wall portion 18a of the turbine shroud S, the inner wall portion 18a will be broken away as indicated in Figure 4, thereby permitting a by-pass flow of the driving gases along the inner periphery of the outer wall 19, and the establishment of an intersecting jet stream through the apertures 27 into the main flow of pressurized gases discharging axially through the outlet 26. The approximate flow path and direction of the by-pass flow through the pockets 21 and resulting radial jet streams through the apertures 27 being indicated by arrows in Figure 4.

The resulting jet streams through the apertures 27 thus serve the treble function of reducing the total pressure head of the driving gases entering the turbine vanes 14 of the turbine wheel T, providing an interference flow into the flow of gases discharging off the trailing edges 17 of the vanes 14 to thus "choke" the outlet 26, and also in the formation of an "air fence," which prevents a further downstream axial shift of the turbine wheel T in the shroud S.

Thus, it will be appreciated that the radial jet streams generated through the pockets 21 and apertures 27 upon destruction of the thin upstream inner wall portion 18a of the shroud S, will prevent any further increase of turbine wheel speed, and thereby possibly prevent a total destruction of the turbine wheel and excessive damage to adjacent components in the aircraft and to the turbine shroud and wheel assembly 10.

Assuming further that an overspeed condition has arisen and a turbine wheel "growth" has resulted, and that the turbine wheel T is continuing to accelerate despite the formation of the jet streams and "air fence" through the slots 27, a final protective measure is incorporated into the shroud S that will prevent total destruction of the turbine shroud and wheel assembly 10 and adjacent components in the aircraft.

To this end, a hardened insert 29 (Figures 1 and 5), as for example, a Carborundum tool bit, or the like, is positioned in one of the web portions of the turbine shroud S and is so located in the shroud as to have its cutting edge 30 radially spaced from the vanes 14 by a distance exceeding the thickness of the thin inner wall portion 18a of the shroud S. Thus, the cutter 30 will prevent any further radial growth of the turbine wheel T, after the wall portion 18a has been broken away, and will also serve to prevent the formation of large fragments from the vanes 14 or inner shroud wall 18 such as might be propelled directly through the outer walls of the shroud S to the possible damage or destruction of adjacent components.

The cutter 29 will similarly function to break up any large fragments that may be displaced from the turbine wheel T and the shroud S in the event of a failure of the bearings 12 and a resulting downstream axial shift of the turbine wheel T.

Thus, it will be appreciated that the novel construction of the turbine shroud provides an emergency control and protective system for the turbine shroud and wheel assembly 10, and adjacent components of the aircraft that becomes effective on failure of other control and sensing systems, the emergency control and protective system provided by the shroud of the invention becoming activated upon rubbing contact between the radial vane peripheries 15 and the adjacent inner wall portion 18a of the shroud S, such as may occur from an overspeed condition, bearing failure, or turbine wheel "growth," to thus minimize the danger of damage to adjacent components in the aircraft by providing for the establishment of an "air fence" to brake the wheel, and finally by providing a cutter to prevent the dislodgment of large turbine wheel or shroud fragments which might otherwise damage or destroy adjacent components in the aircraft.

While only one specific embodiment of the invention has been described herein, it should be understood that variations and modifications may be effected without departing from the novel concepts herein disclosed.

We claim as our invention:

1. A turbine assembly which comprises a turbine wheel having vanes therearound, bearing means rotatably supporting said wheel, a casing surrounding said wheel, said casing having an inner wall in close running clearance relation with said vanes and converging from an inlet at one face of the wheel to an outlet at the opposite face of the wheel, said casing having an inclined outer wall surrounding said inner wall and coacting therewith to provide a space therebetween, nozzle means for introducing driving fluid to said vanes to drive the wheel and discharge from the convergent end of said inner wall, said casing being extended downstream from the convergent end of the inner wall beyond said wheel, said extended portion of the casing having openings therein communicating with the space between the inner and outer walls of the casing, said inner wall of the casing being closely radially spaced from the vanes and adapted to fracture upon rubbing contact with the vanes and thereby vent said space upstream from said openings to the driving gases for by-passing said gases through the space and through said openings to decrease the driving capacity of the gases and permit the wheel to slow down, and said inclined outer wall of the casing being effective to confine fractured fragments and guide the discharge thereof through the extended casing portion under the influence of gas flow through the space and openings.

2. A turbine assembly which comprises a turbine wheel having circumferentially spaced vanes therearound converging from a narrow inlet end to a wide discharge end, a shroud surrounding said turbine wheel and projecting beyond the discharge ends of the vanes, said shroud having a converging inner wall in close running clearance relation with said vanes and a substantially cylindrical inner wall projecting from the convergent end of said first mentioned inner wall, said cylindrical wall having circumferential openings therethrough, said shroud having an inclined outer wall surrounding said inner walls and defining therewith a space vented to said openings, nozzle means for feeding driving gases to the inlet end of said vanes to be confined by the inner walls of the shroud for driving the turbine wheel, said converging inner wall of the shroud being constructed of a relatively easily fracturable material to fracture in the event of rubbing contact between the vanes and said wall and thereby venting the space between the inner and outer walls upstream from said openings whereby the driving gases will be by-passed from the nozzles through said space to said openings to prevent development of excess turbine speeds.

3. A turbine assembly which comprises a turbine wheel having circumferentially spaced vanes therearound, a shroud surrounding said vanes, said shroud having an inner wall in close running clearance relation with said vanes, an outer wall surrounding said inner wall in spaced relation to provide a chamber therebetween, said inner wall being relatively thin and adapted to fracture upon excessive rubbing contact with the vanes to produce fractured pieces of the vanes or inner wall, a cutter radially spaced from the vanes and carried by said shroud effective to reduce the size of fractured pieces from the vanes or inner wall, and said outer wall of the shroud having an inclined portion and being effective to direct the fractured pieces for discharge downstream from the wheel.

4. A turbine shroud adapted for use with a high-speed turbine wheel comprising an annular shroud body having a plurality of gas flow cavities formed therein, said shroud body having an inner wall and a radially spaced outer wall, said inner and outer walls having radially inwardly tapered portions, said inner wall having a plurality of apertures formed therein registering with said cavities and being relatively easily fracturable upon contact with the wheel during its high speed rotation, the radially inwardly tapering inner surface of said outer shroud wall being formed of a relatively high strength material and having an inclined portion deflecting turbine wheel and shroud fragments under the influence of gas flow through the cavities and apertures radially inwardly and axially outwardly away from said shroud upon rubbing contact between the inner wall of said shroud and said wheel.

5. A shroud adapted for use with a high-speed turbine assembly comprising an annular shroud body having an upstream portion enclosing said turbine wheel and a connecting downstream portion extending beyond the normal position of said turbine wheel to define with the upstream portion an outlet for said turbine assembly, said shroud body having a plurality of cavities therein and an inner wall and a radially spaced outer wall defining said cavities, said inner walls having a plurality of radial apertures registering with said cavities in the downstream zone of said shroud body, said inner walls also being relatively thin and frangible to rubbing contact with the associated turbine wheel of said turbine assembly, said outer wall being formed with an axial upstream portion and a radially inwardly tapering downstream portion adjacent said apertures, said shroud body having a recess formed therein to receive a hardened cutter positioned adjacent said turbine wheel, said outer wall and said aperture defining a by-pass flow passage through the cavities in said shroud body on disintegration of said inner wall to form an air fence downstream of the turbine wheel of said turbine assembly to safely direct turbine wheel and shroud fragments through the outlet of said turbine assembly, said cutter serving to augment pulverization of turbine assembly and shroud fragments on rubbing contact between said associated turbine wheel and said shroud.

6. A turbine drive assembly comprising a turbine wheel, bearing means rotatably supporting said wheel, an annular shroud assembly surrounding the wheel and having spaced inner and outer walls defining a plurality of annular cavities, the inner wall being constructed of a relatively easily fracturable metal and being closely radially outwardly spaced from the turbine wheel to define a clearance gap therewith, whereby when wheel movement occurs and the gap is reduced to at least zero the inner wall fractures and the particles therefrom are cast into the annular cavities, the outer wall being swept axially and radially inwardly to direct the particles under the force of gas flow axially outwardly from the wheel without damage to other components.

7. In a turbine wheel assembly having a hub mounting a plurality of circumferentially spaced vanes provided with leading, trailing and circumferential edge portions, the improvement which comprises a shroud assembly surrounding the vanes along their circumferential edge portions, the shroud assembly comprising an annular collar portion adjacent the trailing edge portions of the vanes and providing an axial fluid flow passage therefrom and a connecting annular double wall skirt portion radially outwardly of the circumferential edge portions of the vanes, the skirt portion comprising radially spaced connecting inner and outer walls defining a plurality of annular cavities in communication with the axial flow passage provided by the collar portion, the inner wall of the skirt portion being constructed of a relatively easily fracturable material and being located in sufficiently close clearance relation with the vane circumferential edge portions whereby any radially outward movement of the vanes will fracture the inner wall and fragments from said wall or vanes will be directed by the fluid flow into the annular cavities and axial flow passage without damage to other turbine structure.

References Cited in the file of this patent

UNITED STATES PATENTS

| 1,033,237 | De Ferranti | July 23, 1912 |
| 1,424,242 | Flanders | Aug. 1, 1922 |
| 1,469,045 | MacMurchy | Sept. 25, 1923 |
| 2,314,289 | Salisbury | Mar. 16, 1943 |
| 2,336,323 | Warren | Dec. 7, 1943 |
| 2,390,506 | Buchi | Dec. 11, 1945 |
| 2,427,244 | Warner | Sept. 9, 1947 |
| 2,657,901 | McLeod | Nov. 3, 1953 |
| 2,685,429 | Auyer | Aug. 3, 1954 |
| 2,742,224 | Burhans | Apr. 17, 1956 |
| 2,759,428 | Kirby | Aug. 21, 1956 |
| 2,775,864 | Karcher | Jan. 1, 1957 |
| 2,802,618 | Prachar | Aug. 3, 1957 |